J. Kaufman,
Can Opener.
No. 107,061. Patented Sep. 6, 1870.
Fig. 1.
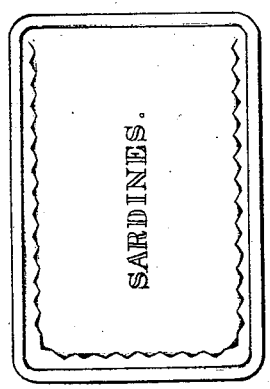
Fig. 2.
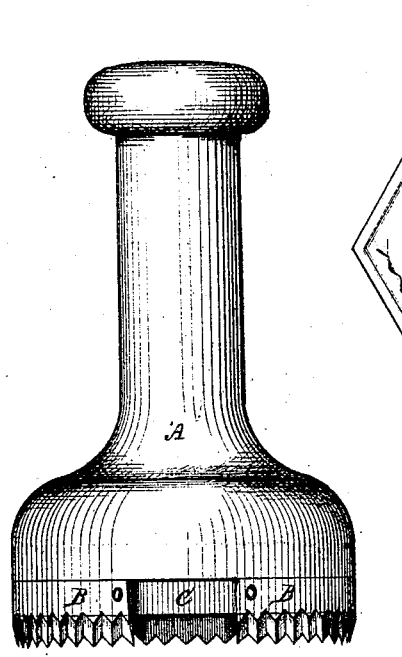
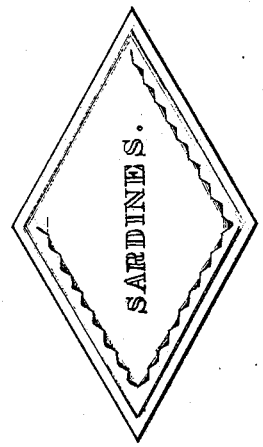
Fig. 3.
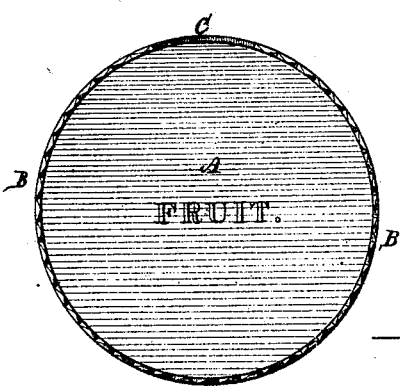
Fig. 4.
E. V. Eliot
A. B. Parker
Witness
Joseph Kaufman
Inventor

United States Patent Office.

JOSEPH KAUFMAN, OF NEW YORK, N. Y.

Letters Patent No. 107,061, dated September 6, 1870.

IMPROVEMENT IN CAN-OPENERS.

The Schedule referred to in these Letters Patent and making part of the same

I, JOSEPH KAUFMAN, of the city, county, and State of New York, have invented certain Improvements in Metallic Can-Openers, of which the following is a specification.

Nature and Object.

This invention relates to that class of devices used in the opening of cans and boxes, made of sheet-metal, for preserving meats and vegetables, and which require to be hermetically sealed until wanted for use; and The object of this invention is to furnish a peculiar kind of stamp or cutter adapted to the shape of the can or box, and so mounted on a handle that, by a single blow upon the handle, the cover is so nearly severed that it may easily be opened.

Drawing.

Figure 1 is a view in elevation of the opener complete.

Figures 2 and 3 are views of sardine-boxes with the lids so cut that they may be easily lifted to uncover the contents of the box.

Figure 4 is a view of the cutting-edge of fig. 1, as best adapted for fruit or meat-cans, which are usually of a cylindrical form.

A, fig. 1, represents the handle, which may be made of wood, so shaped as to be convenient to the hand, as in any ordinary stamp.

B B is the cutter, formed of a strip of steel or similar substance, to furnish durable points or cutting-edges, and said points are first formed similar to those of saw-teeth, and then filed or ground wholly from one side, as shown in the drawing, so that the points of the teeth will be flush with the side of the cutter next to the handle.

The handle, being made to conform to the shape and size of the can or box, or whatever hole or opening required, gives shape to the cutter as it is bent around it or fastened upon it, or the cutter may be shaped to correspond with the handle, and then be fastened upon it, as indicated in the drawing.

The upper edge of said cutter should bear against a shoulder near the lower end of the handle, so as to relieve the action of the blows upon the nails or screws that attach it to the handle.

A space may be left in the cutter, as shown at C, figs. 1 and 4, so that the cover or cap will not be entirely severed, but thereby leave the cover attached to the can or box as a hinge.

A similar representation is indicated in the boxes at figs. 2 and 3, where only three sides are cut, leaving the fourth to serve as a hinge.

The stamp or opener is intended to be made of any shape to suit the taste or convenience of the user, but it will always operate best when made to conform most nearly to the shape and size of the can or box, as by so doing a firmer bearing is given to the cover to be cut.

It is evident that the form and shape of the teeth may be considerably varied, and still perform the functions of my invention; but the points, with the cutting-edges between, like those of a scalloped cutter on harvesters, I have found to be the best, as a cutting-edge is thereby formed from one end to the other.

I do not, therefore, wish to be limited to this exact device; but

What I claim is—

A cutting-stamp or can-opener, substantially as described.

JOSEPH KAUFMAN.

Witnesses:
E. N. ELIOT,
A. B. PARYER.